US009805665B2

(12) United States Patent
Shiomi

(10) Patent No.: US 9,805,665 B2
(45) Date of Patent: Oct. 31, 2017

(54) DISPLAY DEVICE

(71) Applicant: Sharp Kabushiki Kaisha, Osaka-shi, Osaka (JP)

(72) Inventor: Makoto Shiomi, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 21 days.

(21) Appl. No.: 14/907,019

(22) PCT Filed: May 26, 2014

(86) PCT No.: PCT/JP2014/063847
§ 371 (c)(1),
(2) Date: Jan. 22, 2016

(87) PCT Pub. No.: WO2015/040892
PCT Pub. Date: Mar. 26, 2015

(65) Prior Publication Data

US 2016/0163270 A1 Jun. 9, 2016

(30) Foreign Application Priority Data

Sep. 20, 2013 (JP) ................................ 2013-196029

(51) Int. Cl.
*G09G 3/36* (2006.01)
*G09G 3/34* (2006.01)
*G02F 1/1362* (2006.01)

(52) U.S. Cl.
CPC ......... *G09G 3/3413* (2013.01); *G02F 1/1362* (2013.01); *G09G 3/3607* (2013.01); *G09G 3/3614* (2013.01); *G09G 3/3648* (2013.01); *G02F 2201/52* (2013.01); *G09G 2300/0426* (2013.01); *G09G 2300/0452* (2013.01); *G09G 2320/0666* (2013.01); *G09G 2340/0457* (2013.01); *G09G 2354/00* (2013.01)

(58) Field of Classification Search
CPC ......... G09G 3/3614; G09G 2300/0823; G09G 2310/0254
USPC ............................................ 345/79, 96, 209
See application file for complete search history.

(56) References Cited

U.S. PATENT DOCUMENTS 4,642,619 A 2/1987 Togashi
6,552,706 B1 4/2003 Ikeda et al.
(Continued)

FOREIGN PATENT DOCUMENTS

JP 59-111196 A 6/1984
JP 2001-033757 A 2/2001
(Continued)

OTHER PUBLICATIONS

Official Communication issued in International Patent Application No. PCT/JP2014/063847, dated Jul. 8, 2014.

*Primary Examiner* — Michael Pervan
(74) *Attorney, Agent, or Firm* — Steven Reiss

(57) ABSTRACT

This display device is provided with a direct-view display panel in which a first pixel of green, a second pixel of blue, a third pixel of green, and a fourth pixel of red are arranged in a Bayer pattern. Luminance information that corresponds to a pixel position of the first pixel and serves as a basis for a display signal supplied to the first pixel is separate from luminance information that corresponds to a pixel position of the third pixel and serves as a basis for a display signal supplied to the third pixel.

16 Claims, 17 Drawing Sheets

(56) References Cited

U.S. PATENT DOCUMENTS

| | | | | |
|---|---|---|---|---|
| 2006/0055648 | A1* | 3/2006 | Kamada | G02F 1/13452 345/87 |
| 2012/0056912 | A1 | 3/2012 | Adachi | |
| 2013/0227179 | A1* | 8/2013 | Kalayjian | G06F 1/1698 710/36 |
| 2014/0078338 | A1 | 3/2014 | Hatano | |

FOREIGN PATENT DOCUMENTS

| | | | |
|---|---|---|---|
| JP | 2010-204674 | A | 9/2010 |
| JP | 2011-099961 | A | 5/2011 |
| JP | 2012-053387 | A | 3/2012 |
| JP | 2012-230173 | A | 11/2012 |
| WO | 2012/169140 | A1 | 12/2012 |

* cited by examiner

DISPLAY DEVICE

TECHNICAL FIELD

The present invention relates to a direct-view display device including a liquid crystal display, an organic EL display, and a plasma display.

BACKGROUND ART

Patent Literature 1 discloses a configuration in which one pixel of a liquid crystal panel is formed of four sub-pixels made of two rows and two columns (a red sub-pixel, a blue sub-pixel, and two green sub-pixels) and in which the two green sub-pixels are arranged diagonally opposite each other.

CITATION LIST

Patent Literature

Patent Literature 1: JP 2001-33757 A (Date of Disclosure: Feb. 9, 2001)

SUMMARY OF INVENTION

Technical Problem

In the above-described conventional configuration, a display signal is supplied to each of the four sub-pixels based on one piece of luminance information corresponding to a pixel position (luminance information). This configuration has a problem that there is a large number of signal lines (data signal lines and scan signal lines) to drive, compared with definition (the number of pixels).

The present invention is intended to provide a direct-view display device that achieves high definition while suppressing the number of signal lines (the number of input terminals) to drive.

Solution to Problem

The present display device includes a direct-view display panel in which a first pixel of green, a second pixel of blue, a third pixel of green, and a fourth pixel of red are arranged in a Bayer pattern (an array in which a first to fourth pixels made of two rows and two columns are arranged such that the first pixel of green and the third pixel of green are arranged diagonally opposite each other). Furthermore, the present display device is configured such that luminance information that corresponds to a pixel position of the first pixel and that serves as a basis for a display signal supplied to the first pixel is separate from luminance information that corresponds to a pixel position of the third pixel and that serves as a basis for a display signal supplied to the third pixel.

Advantageous Effects of Invention

According to an aspect of the present invention, it is possible to decrease the number of signal lines to drive compared with the definition (the number of pixels), and to provide the direct-view display device that achieves high definition while suppressing the number of input terminals.

DESCRIPTION OF EMBODIMENTS

Figure 1:
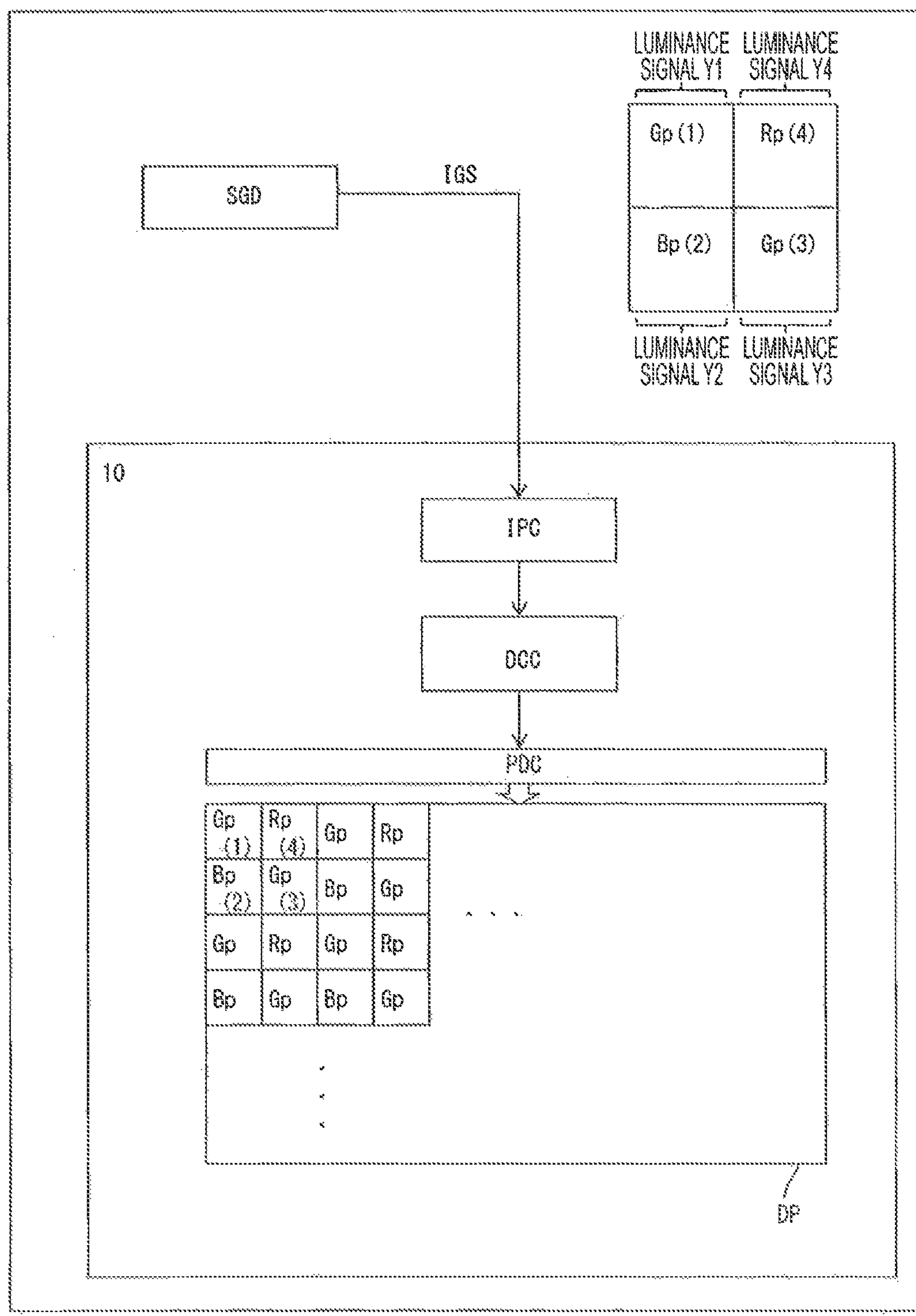
FIG. 1 is a block diagram illustrating a configuration of a liquid crystal display device according to an embodiment.

As illustrated in FIG. 1, a display device 10 according to the present embodiment includes an input processing circuit IPC, a display control circuit DCC, a panel drive circuit PDC, and a direct-view display panel DP. The input processing circuit IPC processes an image signal IGS transmitted from a signal generating device SGD and inputs the signal into the display control circuit DCC. The display control circuit DCC controls the panel drive circuit PDC. The panel drive circuit PDC drives the display panel DP.

On the display panel DP, a first pixel of green Gp(1), a second pixel of blue Bp(2), a third pixel of green Gp(3), and a fourth pixel of red Rp(4) are arranged in a Bayer pattern. The Bayer pattern is a pattern in which, among pixels formed by two rows and two columns (a horizontal direction is defined as a row direction, and a vertical direction is defined as a column direction in FIG. 1), the first to four pixel are arranged such that the first pixel of green Gp(1) and the third pixel of green Gp(3) are diagonally opposite each other, and the second pixel of blue Bp(2) and the fourth pixel of red Rp(4) are diagonally opposite each other. This Bayer pattern is also referred to as a dual green system (DG system).

As illustrated in FIG. 1, there are four separate signals of a luminance signal Y1, a luminance signal Y2, a luminance signal Y3, and a luminance signals Y4. The luminance signal Y1 corresponds to a pixel position of the first pixel Gp(1) and serves as a basis for a display signal supplied to the first pixel Gp(1) of green. The luminance signal Y2 corresponds to a pixel position of the second pixel Bp(2) and serves as a basis for a display signal supplied to the second pixel Bp(2) of blue. The luminance signal Y3 corresponds to a pixel position of the third pixel Gp(3) and serves as a basis for a display signal supplied to the third pixel Gp(3) of green. The luminance signal Y4 corresponds to a pixel position of the fourth pixel Rp(4) and serves as a basis for a display signal supplied to the fourth pixel Rp(4) of red.

In the display device 10, the green pixels are arranged in a checkerboard pattern. According to this pattern, any pixel row includes a green pixel and any pixel column includes a green pixel. Therefore, compared with a sub-pixel system display device with the same number of pixels, the display device 10 achieves definition with no significant difference from the sub-pixel system display. Herein, the sub-pixel system display refers to, for example, a display that uses a system in which one pixel that corresponds to one luminance signal Y is divided into three sub-pixels of R, G, and B arranged in a row direction, and each of the sub-pixels is driven. On the other hand, on the display device 10, the number of pixels of the display panel DP is equal to the number of input terminals needed to drive the pixels of the display panel DP. Accordingly, compared with the sub-pixel system display device as described above, it is possible to reduce the number of input terminals in the row direction (horizontal direction) to one-third of the sub-pixel system device. In a case where the number of pixels of the display panel DP is, for example, 8K (approximately 8000) horizontally×4000 (4K) vertically, the required number of input terminals in the horizontal direction is 8K (in the sub-pixel system display device as described above, the required number of input terminals in the horizontal direction would be 24K). Accordingly, it is possible to provide a direct-view display device that achieves high definition while suppressing the number of input terminals. The display device 10 may be a liquid crystal display device with a direct-view liquid crystal panel, an organic EL display, and a plasma display, or the like. A more desirable display would be a display that uses, as a pixel, an IPS liquid crystal, or an organic light emitting diode (OLED). A desirable screen size would be 70 inch or less in diagonal dimension but is not limited to this. Desirable screen luminance would be 150 to 300 Cd or less. Note that it is desirable that, in consideration of use outdoors, the display device has a mode to switch to ultra-high luminance (600 Cd or more, for example). Projectors with the DG system are currently on sale. However, they have problems that focus adjustment is not easy due to their operation principles and not useful in bright space, that it is difficult to display accurately without fixing the screen (only useful in a space with dedicated environment, such as a projection chamber), or the like.

Example 1

Figure 2:
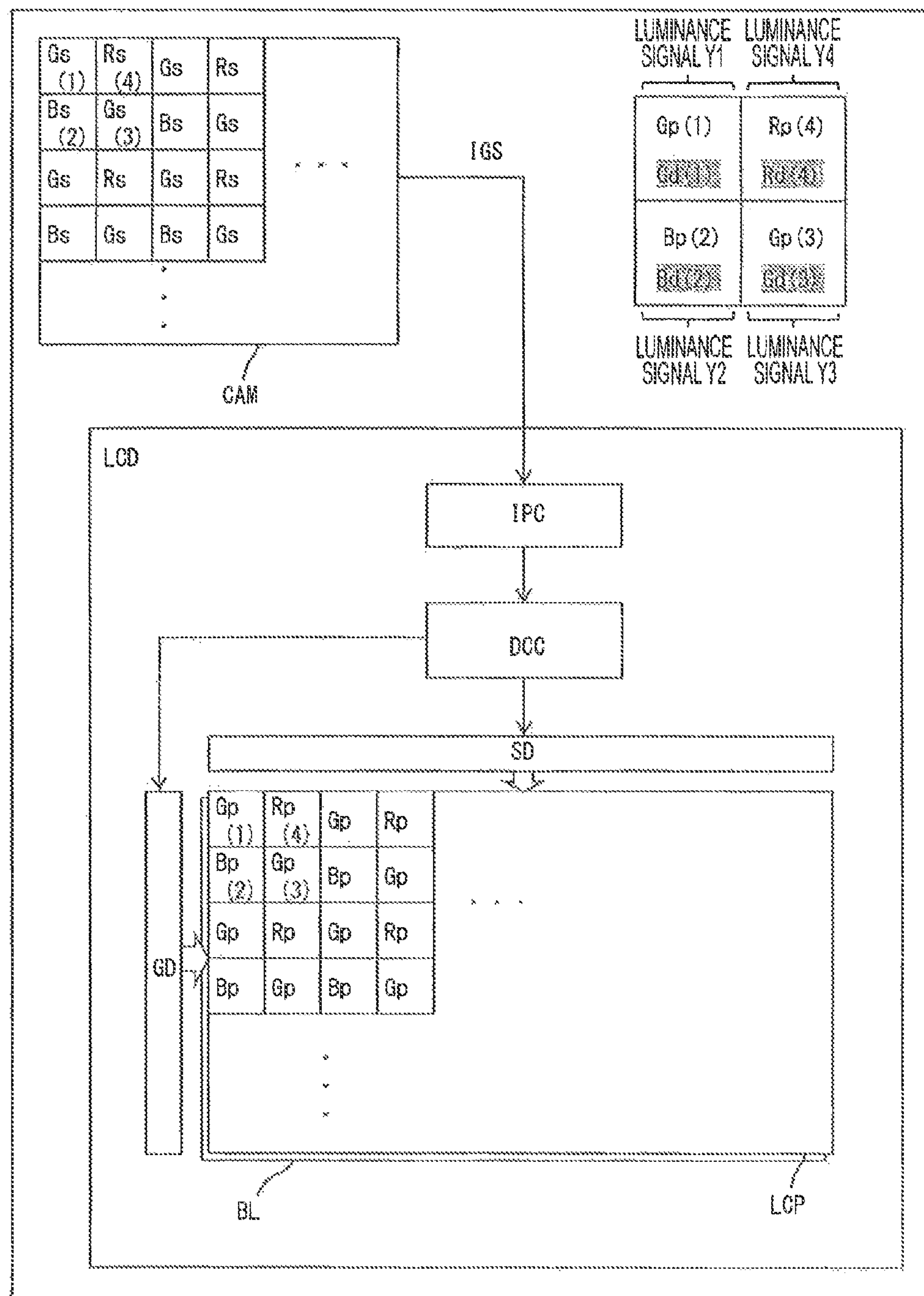
FIG. 2 is a block diagram illustrating a configuration of a liquid crystal display device according to Example 1.
Figure 3:
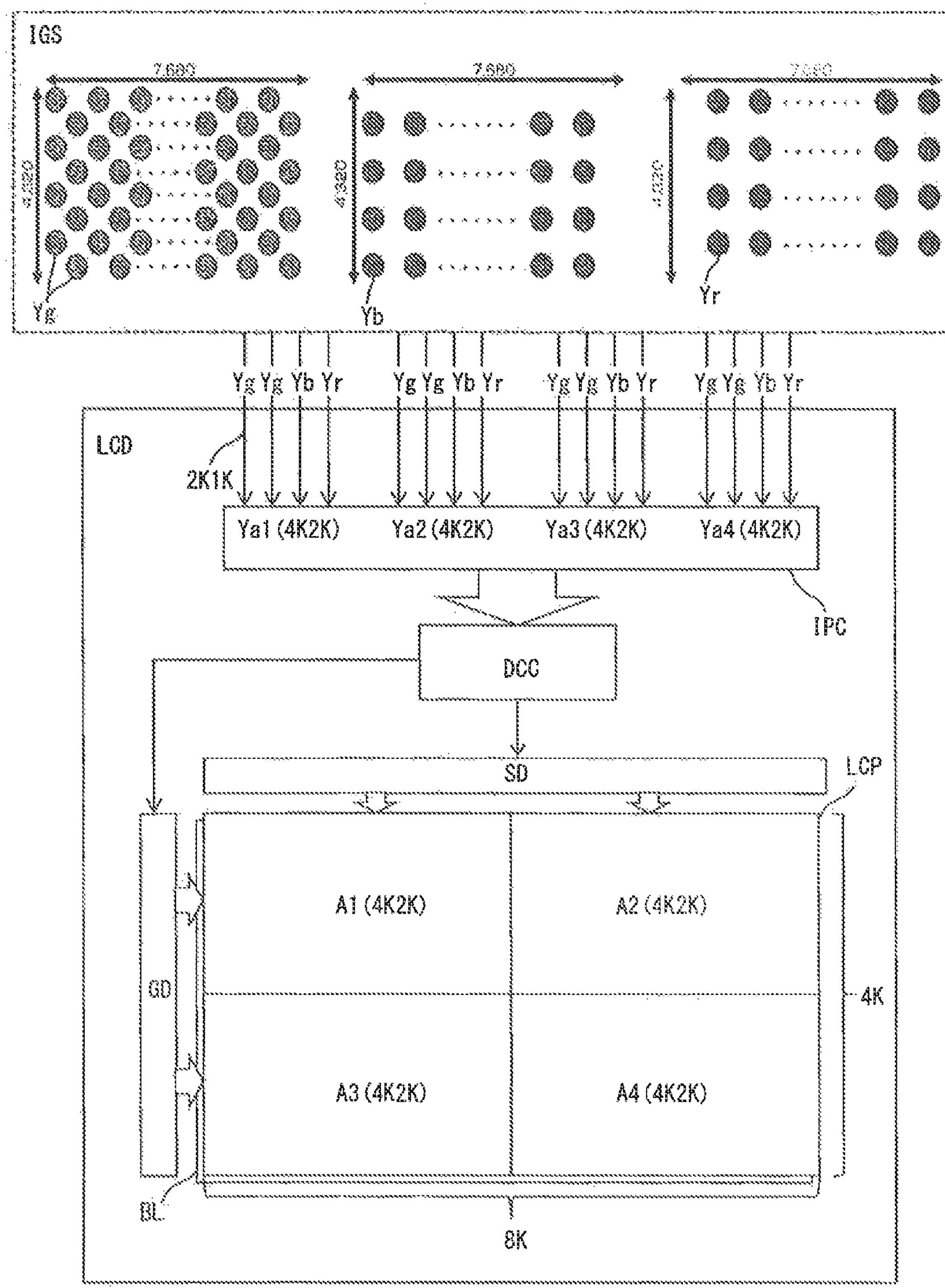
FIG. 3 is a schematic diagram illustrating a configuration of the liquid crystal display device according to Example 1.

As illustrated in FIGS. 2 and 3, the liquid crystal display device LCD according to Example 1 includes an input processing circuit IPC, a display control circuit DCC, a source driver SD, a gate driver GD, and a direct-view liquid crystal panel LCP and a backlight BL. The input processing circuit IPC processes an image signal (imaging signal) IGS transmitted from an imaging device CAM that is a signal generating device, and inputs the signal to the display control circuit DCC. The display control circuit DCC controls the source driver SD and the gate driver GD. The source driver SD and the gate driver GD drive the liquid crystal panel LCP.

Photosensors in the imaging device CAM according to Example 1 are arranged in the Bayer pattern. Specifically, the pattern has first to fourth photosensors of Gs(1), Bs(2), Gs(3), and Rs(4) formed by two rows and two columns, and is configured such that the first photosensor of green Gs(1) and the third photosensor of green Gs(3) are diagonally opposite each other, and the second photosensor of blue Bs(2) and the fourth photosensor of red Rs(4) are diagonally opposite each other (DG system). Similarly, on the liquid crystal panel LCP, a first pixel of green Gp(1), a second pixel of blue Bp(2), a third pixel of green Gp(3), and a fourth pixel of red Rp(4) are arranged in the Bayer pattern.

As illustrated in FIG. 2, the input processing circuit IPC generates pixel data Gd(1), Bd(2), Gd(3), and Rd(4). Specifically, the input processing circuit IPC generates the pixel data Gd(1) of the first pixel of green Gp(1) based on a luminance signal Y1 from the first photosensor of green Gs(1), the pixel data Bd(2) of the second pixel of blue Bp(2) based on a luminance signal Y2 from the second photosensor of blue Bs(2), the pixel data Gd(3) of the third pixel of green Gp(3) based on a luminance signal Y3 from the third photosensor of green Gs(3), and the pixel data Rd(4) of the fourth pixel of red Rp(4) based on a luminance signal Y4 from the fourth photosensor of red Rs(4).

The image signal IGS from the imaging device CAM has a size of 8K (approximately 8000)×4K (approximately 4000), for example, as illustrated in FIG. 3, and includes checkerboard-patterned green luminance signals Yg (16K), matrix-patterned blue luminance signals Yb (8K), and matrix-patterned red luminance signals Yr (8K).

As illustrated in FIG. 3, the number of pixels of the liquid crystal panel LCP is, for example, 8K (approximately 8000)×4K (approximately 4000), and input to the input processing circuit IPC is performed, for example, by sixteen systems (using sixteen high-definition serial digital interface (HD-SDI) cables). Specifically, the liquid crystal panel LCP is divided horizontally and vertically into four areas (areas A1 to A4; each of areas A1 to A4 has 4K×2K size). A luminance signal Ya1 that corresponds to the area A1 is input via four (two for Yg, one for Yb, one for Yr) HD-SDI cables (2K×1K for one cable). A luminance signal Ya2 that corresponds to the area A2 is input via four (two for Yg, one for Yb, one for Yr) HD-SDI cables (2K×1K for one cable). A luminance signal Ya3 that corresponds to the area A3 is input via four (two for Yg, one for Yb, one for Yr) HD-SDI cables (2K×1K for one cable). A luminance signal Ya4 that corresponds to the area A4 is input via four (two for Yg, one for Yb, one for Yr) HD-SDI cables (2K×1K for one cable). It is also possible, by using an optical interface, to incorporate the above-described transmission of sixteen systems into one system (with one optical fiber cable, for example).

Figure 4:
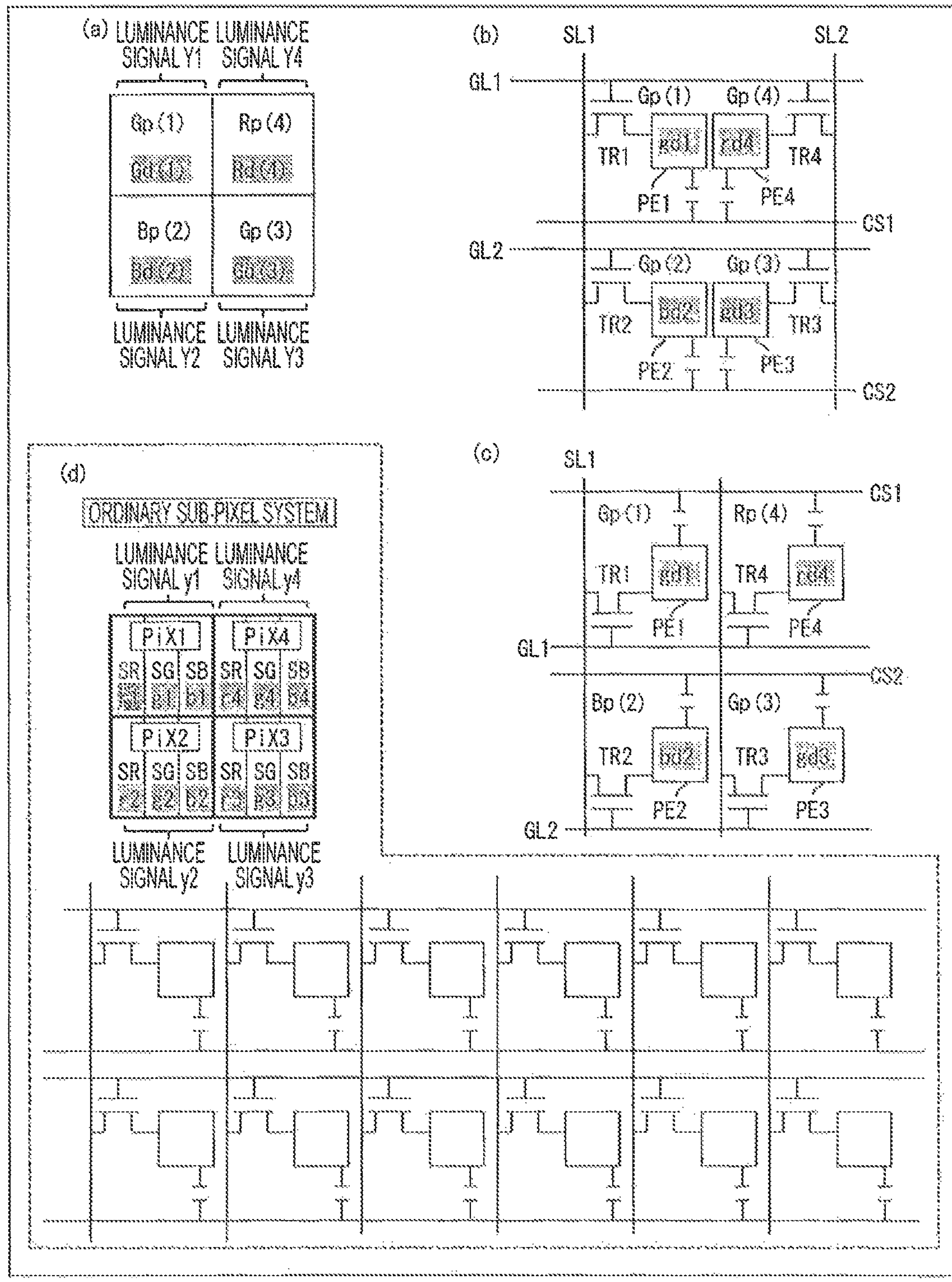
FIGS. 4(*a*) to 4(*d*) are block diagrams illustrating an effect according to Example 1.

On the liquid crystal panel LCP, as illustrated in FIGS. 4(*a*) and 4(*b*), pixel electrodes PE1 to PE4 are connected to signal lines. Specifically, the pixel electrode PE1 of the first pixel of green Gp(1) is connected to a data signal line SL1 and a scan signal line GL1 via a transistor TR1. The pixel electrode PE2 of the second pixel of blue Bp(2) is connected to the data signal line SL1 and a scan signal line GL2 via a transistor TR2. The pixel electrode PE3 of the third pixel of green Gp(3) is connected to a data signal line SL2 and the scan signal line GL2 via a transistor TR3. The pixel electrode PE4 of the fourth pixel of red Rp(4) is connected to the data signal line SL2 and the scan signal line GL1 via a transistor TR4. In addition, an auxiliary capacitance line CS1 provides an auxiliary capacitance with the pixel electrode PE1 and the pixel electrode PE4. An auxiliary capacitance line CS2 provides an auxiliary capacitance with the pixel electrode PE2 and the pixel electrode PE3.

Each of display signals gd1, bd2, gd3, and rd4 is written into each of the pixel electrodes PE1 to PE4. Specifically, the display signal gd1 that corresponds to the pixel data Gd(1) is written into the pixel electrode PE1 via the data signal line SL1 and the transistor TR1. The display signal bd2 that corresponds to the pixel data Bd(2) is written into the pixel electrode PE2 via the data signal line SL1 and the transistor TR2. The display signal gd3 that corresponds to the pixel data Gd(3) is written into the pixel electrode PE3 via the data signal line SL2 and the transistor TR3. The display signal rd4 that corresponds to the pixel data Rd(4) is written into the pixel electrode PE4 via the data signal line SL2 and the transistor TR4. FIG. 4(*b*) is merely an example of the liquid crystal panel LCP. It is possible to have an alternative configuration as illustrated in FIG. 4(*c*).

When the liquid crystal display device LCD according to Example 1 is compared with a liquid crystal display device using an ordinary sub-pixel system with the same number of pixels, as illustrated in FIG. 4(*d*), (specifically, sub-pixel data r1, g1, and b1 of three sub-pixels SR, SG, and SB are created from a luminance signal y1 that corresponds to a first pixel PiX1, sub-pixel data r2, g2, and b2 of three sub-pixels SR, SG, and SB are created from a luminance signal y2 that corresponds to a second pixel PiX2, sub-pixel data r3, g3, and b3 of three sub-pixels SR, SG, and SB are created from a luminance signal y3 that corresponds to a third pixel PiX3, and sub-pixel data r4, g4, and b4 of three sub-pixels SR, SG, and SB are created from a luminance signal y4 that corresponds to a fourth pixel PiX4, namely, twelve sub-pixels are driven with six data signal lines and two scan signal lines), the liquid crystal display device LCD according to Example 1 can reduce the number of data signal lines (the number of source terminals) to one-third of the ordinary device without significantly impairing definition.

Furthermore, by using the liquid crystal display device LCD according to Example 1, it is possible to display the image signal IGS of the DG system from the imaging device CAM, as illustrated in FIGS. 2 and 3, directly onto the liquid crystal panel LCP of the DG system. With this configuration, it is possible to omit or minimize processing such as resolution conversion (processing that might impair original property) that would be required in displaying signals on a liquid crystal display device with the ordinary sub-pixel system.

Example 2

Figure 5:
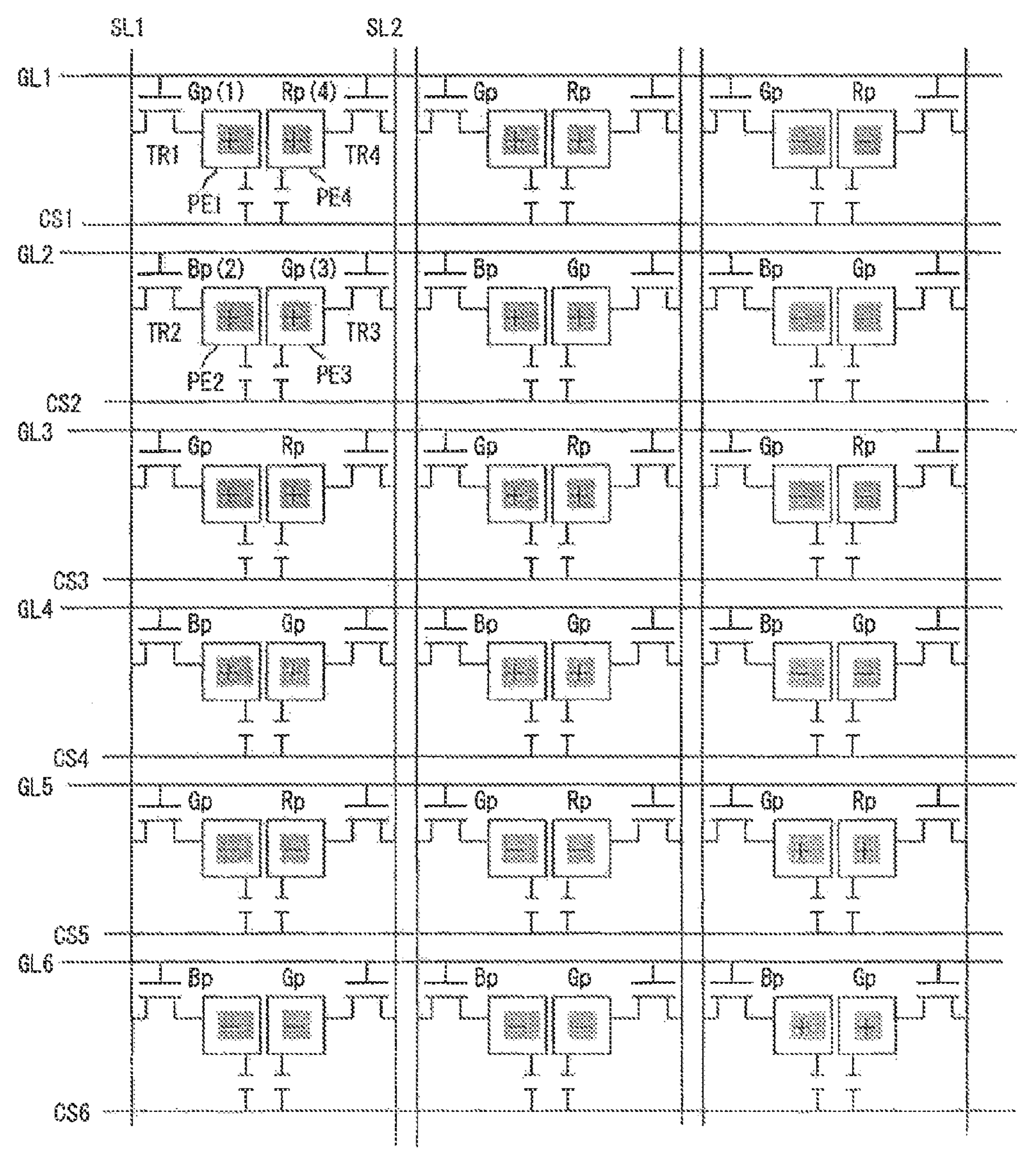
FIG. 5 is a schematic diagram illustrating a driving method according to Example 2.
Figure 6:
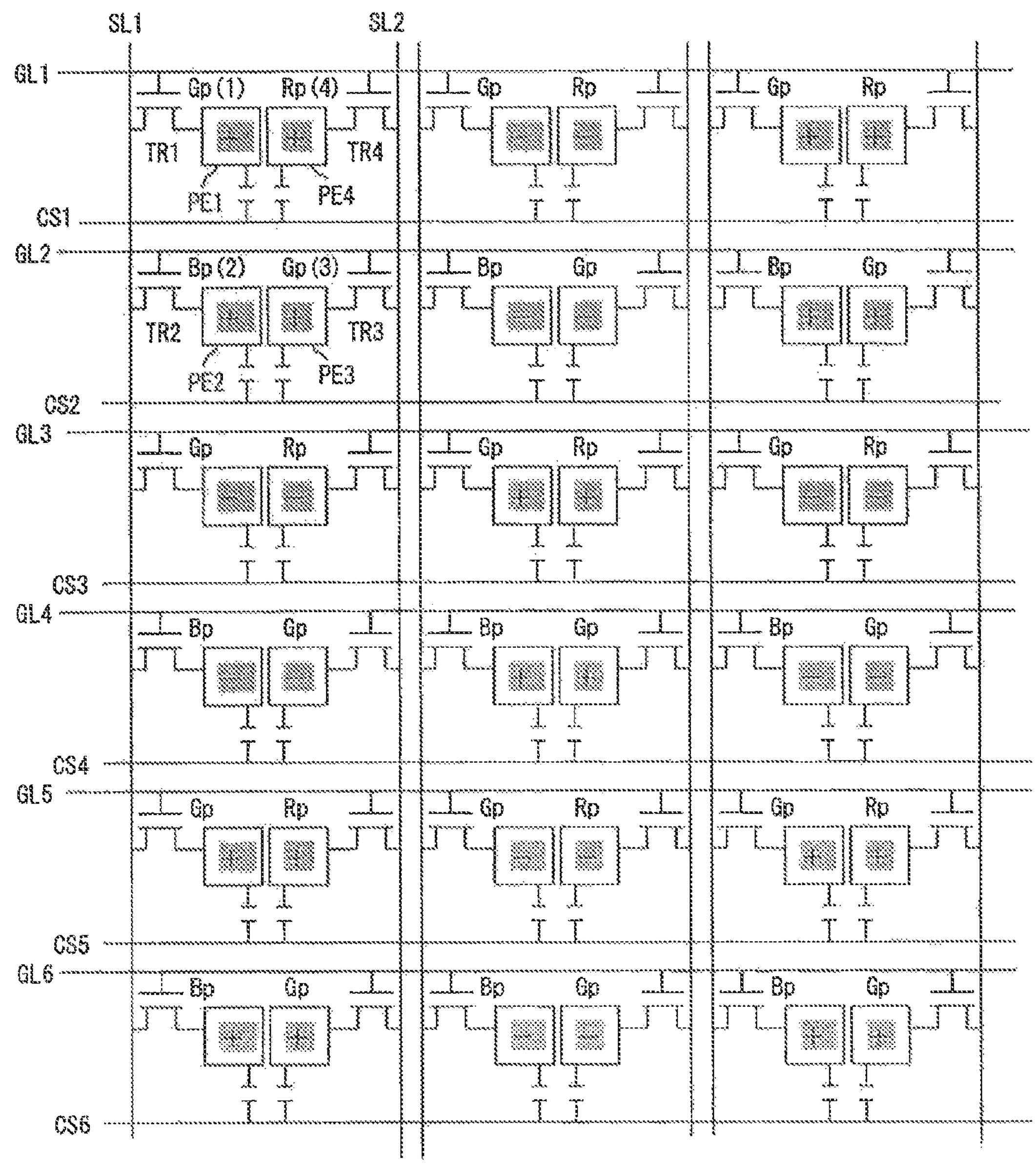
FIG. 6 is a schematic diagram illustrating another driving method according to Example 2.
Figure 7:
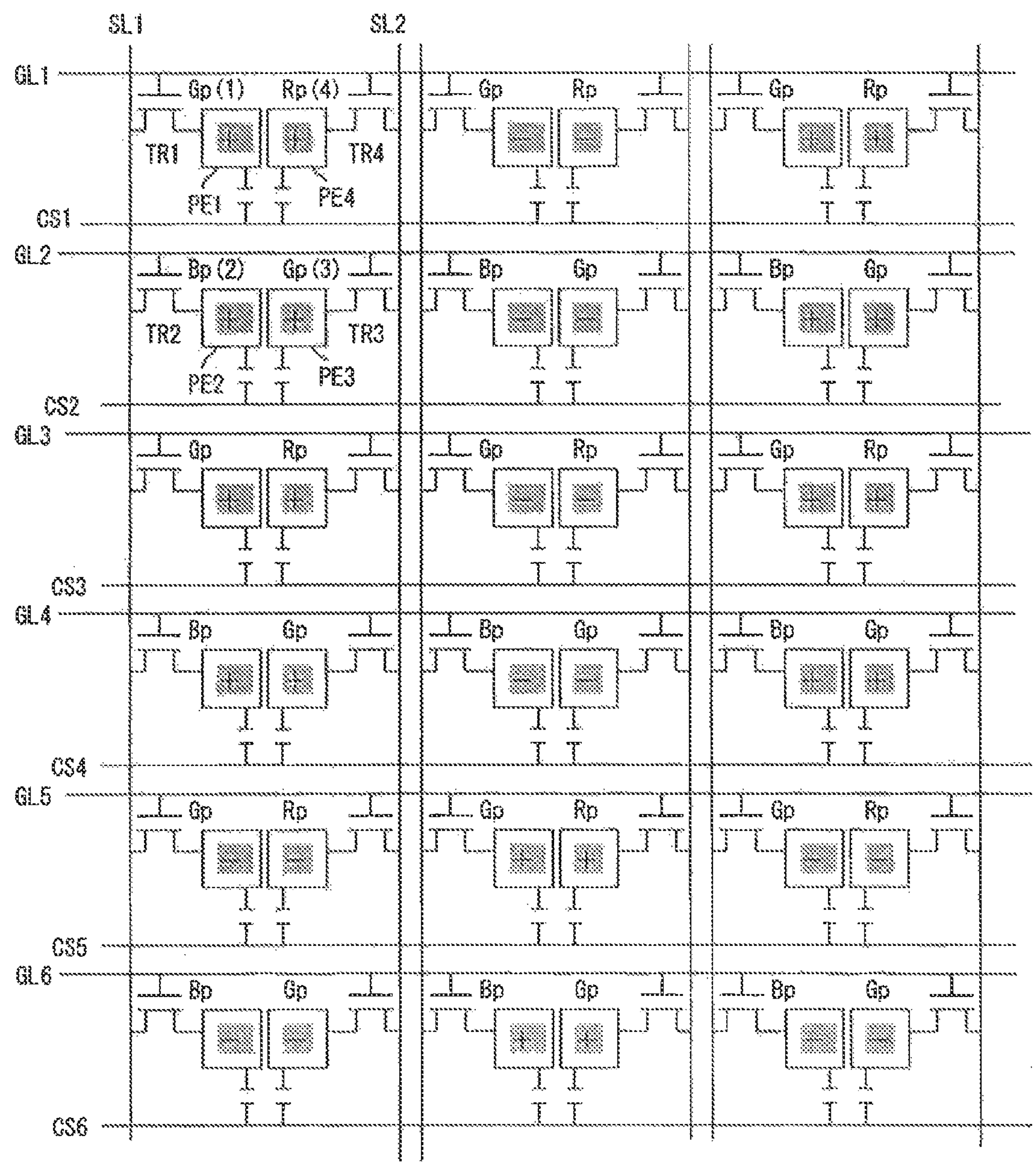
FIG. 7 is a schematic diagram illustrating still another driving method according to Example 2.

In Example 2, as illustrated in FIGS. 5 to 7, writing polarity of the display signal for the liquid crystal panel LCP is inverted. Inversion is performed every 2×i (i: positive integer) pixels in one pixel row and performed every 2×j (j: positive integer) pixels in one pixel column. In viewpoints of power consumption of drivers and a charging rate, it is desirable to increase i and j. However, increasing i and j might degrade a display quality due to visibility of flicker, or the like.

In this respect, it is desirable that, in super high vision (SHV) viewing defined in ITU-R BT. 2020, one pixel is not recognizable at a viewing distance of 0.75H (H: diagonal length of a display section). Assuming the liquid crystal panel having the number of pixels of 8K×4K, it is a general concept that a block of 4×4 pixels is not recognizable at a viewing distance of 3H and that a block of 8×8 pixels is not recognizable at an ordinary viewing distance of 6H. This recognition accuracy is based on a 1H (horizontal line) stripe display of a CRT (interlace drive), and a unit of flicker (block with positive polarity and block with negative polarity) in Example 2 is arranged in a checkerboard pattern. In view of these, although it depends on a displayed pattern, it is not easy, in some cases, to recognize a block of 8×8 pixels at a viewing distance of 3H, for example. In addition, it is known that recognition accuracy is higher in a horizontal direction (row direction) compared with a vertical direction (column direction).

From the above, i and j are defined to vary with the required display quality and the viewing distance. Normally, it is determined, as illustrated in FIG. 5, to use the configuration of i=j=2 (4×4 pixels inverted). In a situation where high quality is required, it is determined, as illustrated in FIG. 6, to use the configuration of i=j=1 (2×2 pixels inverted). In a situation where high quality is not relatively required, it is determined to use the configuration of i=j=4 (8×8 pixels inverted). In addition, it is possible to determine to use the configuration of i<j considering the higher perception accuracy in the horizontal direction. For example, it is advantageous and desirable that a configuration of i=1, j=2 is used and pixels with the same polarity are arranged in the vertical direction as illustrated in FIG. 7 (such that the block to be a unit of flicker would be arranged vertically) in view of both perception and power consumption.

Figure 8:
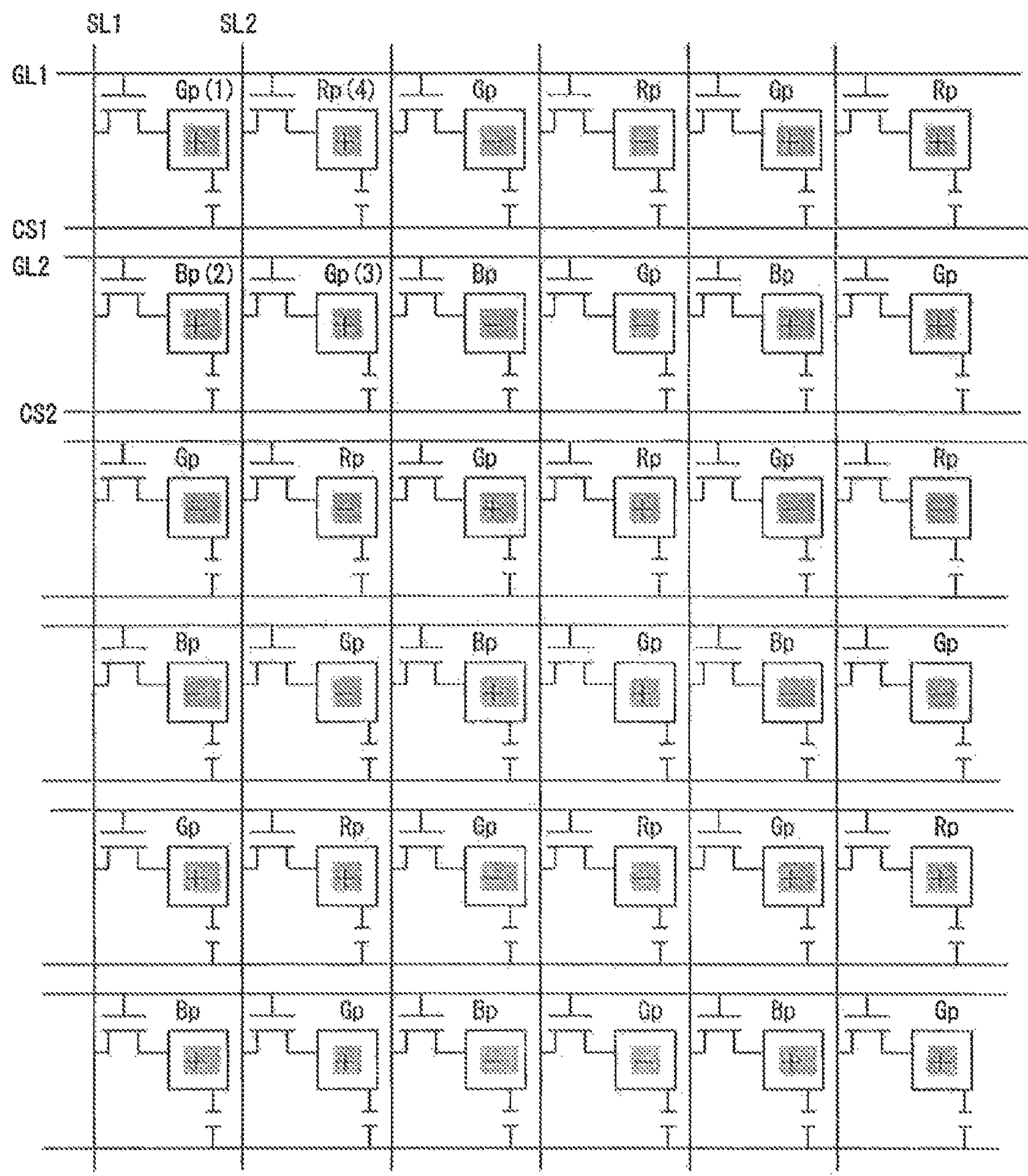
FIG. 8 is a schematic diagram illustrating still another driving method according to Example 2.

In FIGS. 5 to 7, arrangement of the data signal lines (left side/right side) in connection varies in one or another of adjacent pixel rows. However, the arrangement is not limited to this pattern. As illustrated in FIG. 8, it is possible to configure such that one and another of two pixels adjacent to each other are connected to the data signal lines that are arranged on the same side (left/right), for example, on the left side, as illustrated in FIG. 8.

Figure 9:
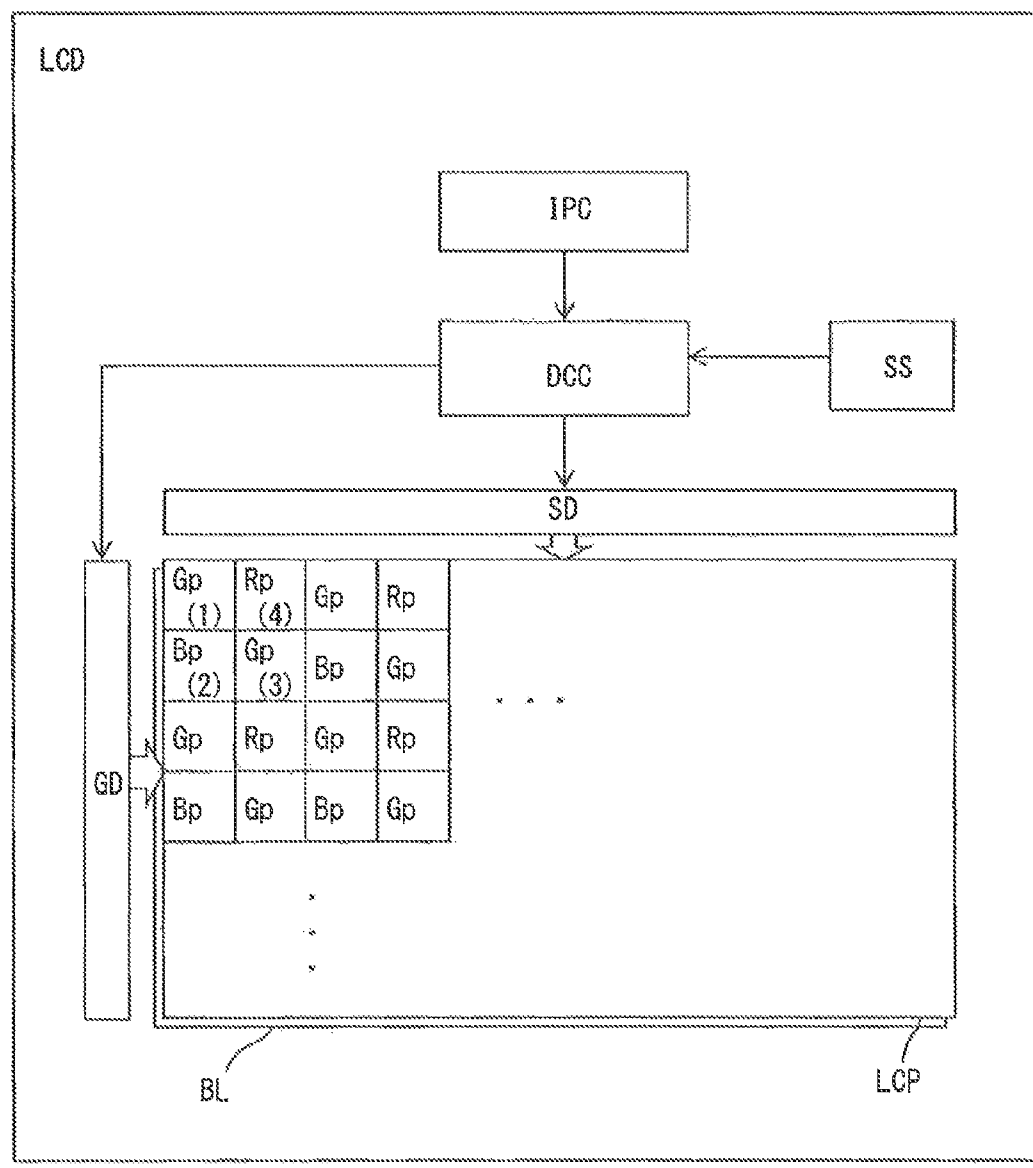
FIG. 9 is a schematic diagram illustrating a configuration of a liquid crystal display device according to Example 2.

In Example 2, it is possible to configure, as illustrated in FIG. 9, such that at least one of the above-described i and j is determined by a setting signal input from a setting section SS provided on the liquid crystal display device LCD into the display control circuit DCC. For example, it may be configured such that the setting section SS generates a setting signal according to an instruction from a user input section integrated in the liquid crystal display device LCD or an instruction (user input) from a user input device provided separately from the liquid crystal display device LCD. In this case, it is desirable that a part of buttons on the user input section or the user input device is configured to correspond to a parameter such as “smoothness”.

Figure 10:
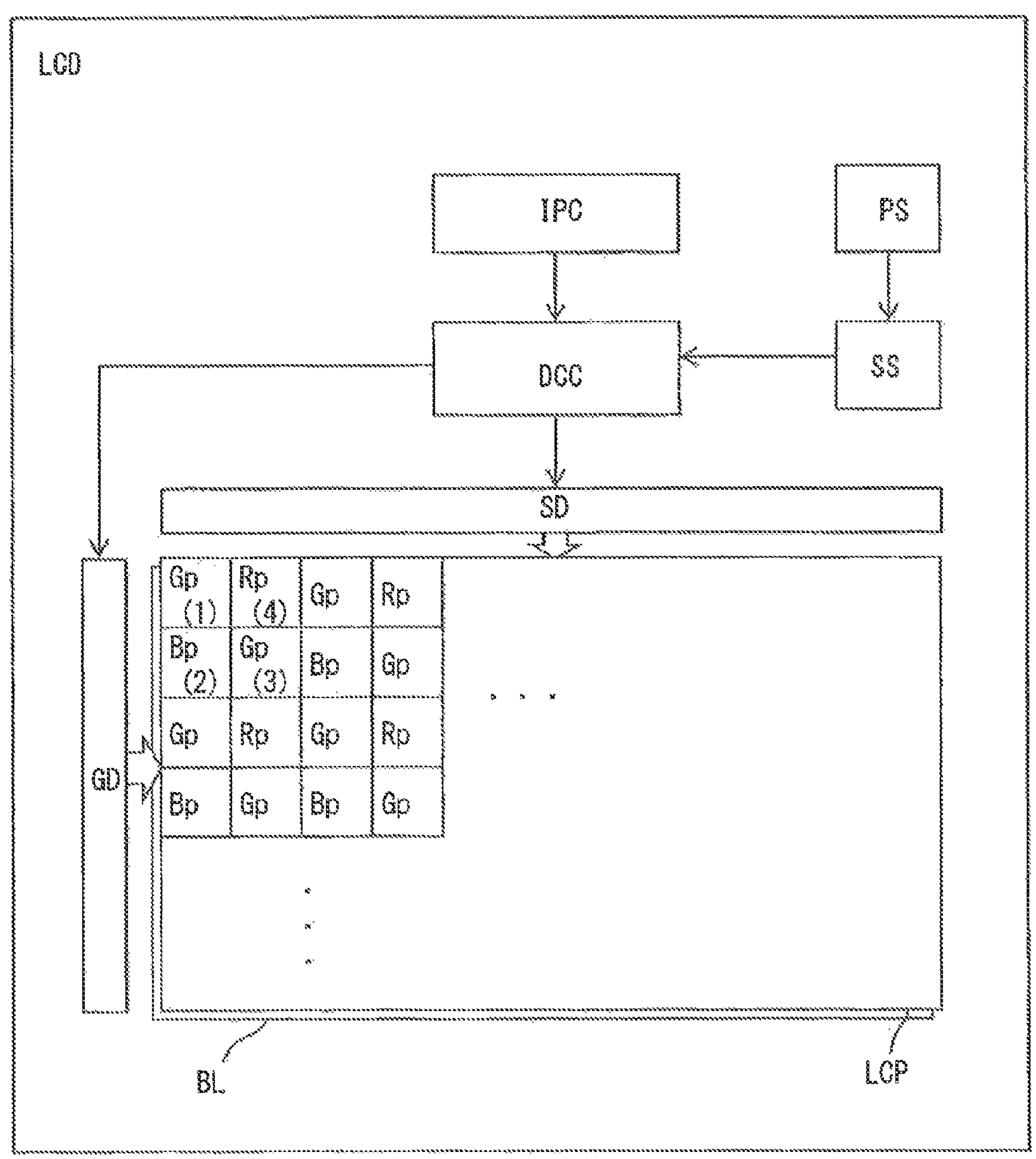
FIG. 10 is a schematic diagram illustrating another configuration of the liquid crystal display device according to Example 2.

In addition, as illustrated in FIG. 10, it is also possible to configure such that the setting section SS generates the setting signal according to a distance between a viewer and a screen, obtained by a human sensor PS provided on the liquid crystal display device LCD.

Figure 11:
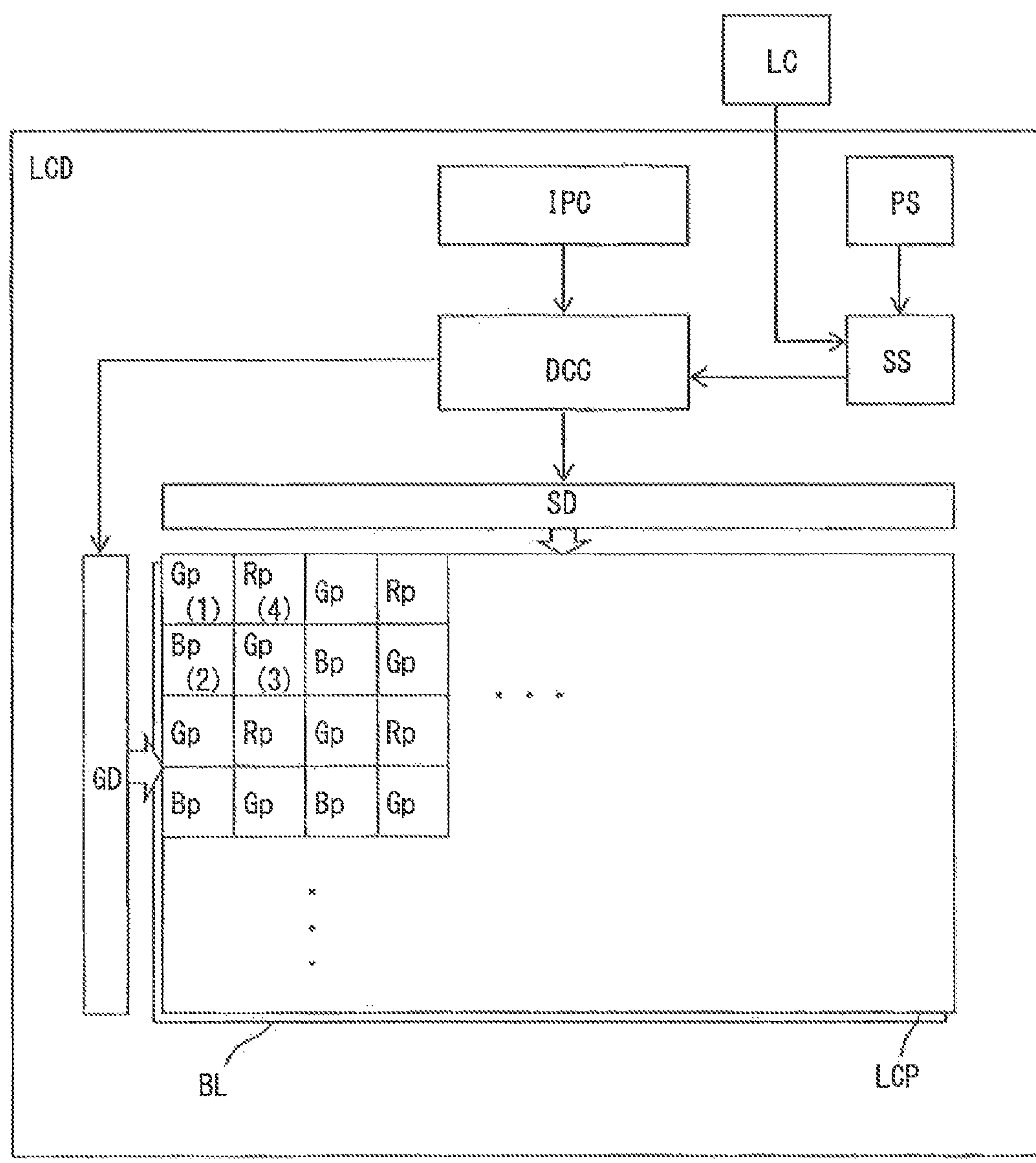
FIG. 11 is a schematic diagram illustrating still another configuration of the liquid crystal display device according to Example 2.

The setting signal is normally generated, as the setting section SS illustrated in FIG. 11, according to the distance between the viewer and the screen obtained by the human sensor PS (at least one of the above-described i and j is automatically set to its optimized value). When the viewer has a desire to set the value manually, it is also possible to configure, for example, such that setting signal is generated according to the user input from a user input device LC (remote control).

Example 3

Figure 12:
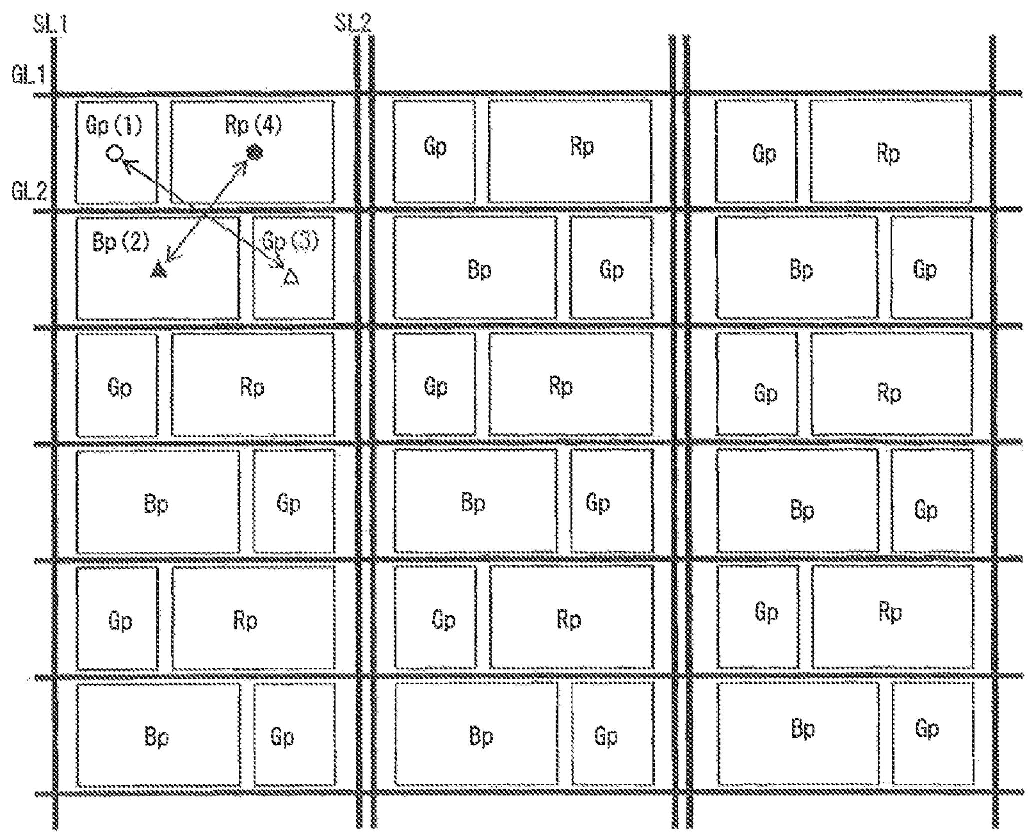
FIG. 12 is a schematic diagram illustrating a configuration of a liquid crystal display device according to Example 3.

In Example 3, as illustrated in FIG. 12, effective area of the first pixel of green Gp(1) is set to be smaller than effective area of the second pixel of blue Bp(2). Moreover, effective area of the third pixel of green Gp(3) is set to be equal to the effective area of the first pixel of green Gp(1), and effective area of fourth pixel of red Rp(4) is set to be equal to the effective area of the second pixel of blue Bp(2).

More specifically, pixel electrode area corresponding to the first pixel of green Gp(1) is set to be smaller than pixel electrode area corresponding to the second pixel of blue Bp(2), and area of a color filter portion corresponding to the first pixel of green Gp(1) is set to be smaller than area of a color filter portion corresponding to the second pixel of blue Bp(2).

With this configuration, it is possible to achieve luminance balance in each of the colors on an entire screen without significantly impairing luminance efficiency of the entire liquid crystal panel, compared with a technique of relatively suppressing display signal of the green pixel, or lowering the luminance of the green color on the backlight BL. Moreover, it is also possible to achieve greater sharpness due to reduced area of the green pixel.

Furthermore, as illustrated in FIG. 12, a distance between a center-of-gravity position (white circle) of the first pixel of green Gp(1) and a center-of-gravity position (white triangle) of the third pixel of green Gp(3) is longer than the distance between a center-of-gravity position (black triangle) of the second pixel of blue Bp(2) and a center-of-gravity position (black circle) of the fourth pixel of red Rp(4). In other words, the pixels are arranged as follows. The first pixel of green Gp(1) and the fourth pixel of red Rp(4) are arranged adjacent to each other in a row direction. The two data signal lines SL1 and SL2 extending in a column direction are arranged so as to sandwich the first to fourth pixels Gp(1), Bp(2), Gp(3), and Rp(4) in between. Both of the first and second pixels Gp(1) and Bp(2) are arranged to be apart, for a same distance, from the data signal line SL1. Both of the third and fourth pixels Gp(3) and Rp(4) are arranged to be apart, for a same distance, from the data signal line SL2. A width of the first pixel of green Gp(1) in the row direction (parallel to the scan signal line) is smaller than a width of the fourth pixel of red Rp(4) in the row direction. A width of the third pixel of green Gp(3) in the row direction is smaller than a width of the second pixel of blue Bp(2) in the row direction. As in this configuration, by forming each of the first pixel of green Gp(1) and the third pixel of green Gp(3) to be small, and by arranging them to have a certain distance between each other, it is possible to further increase sharpness.

Figure 13:
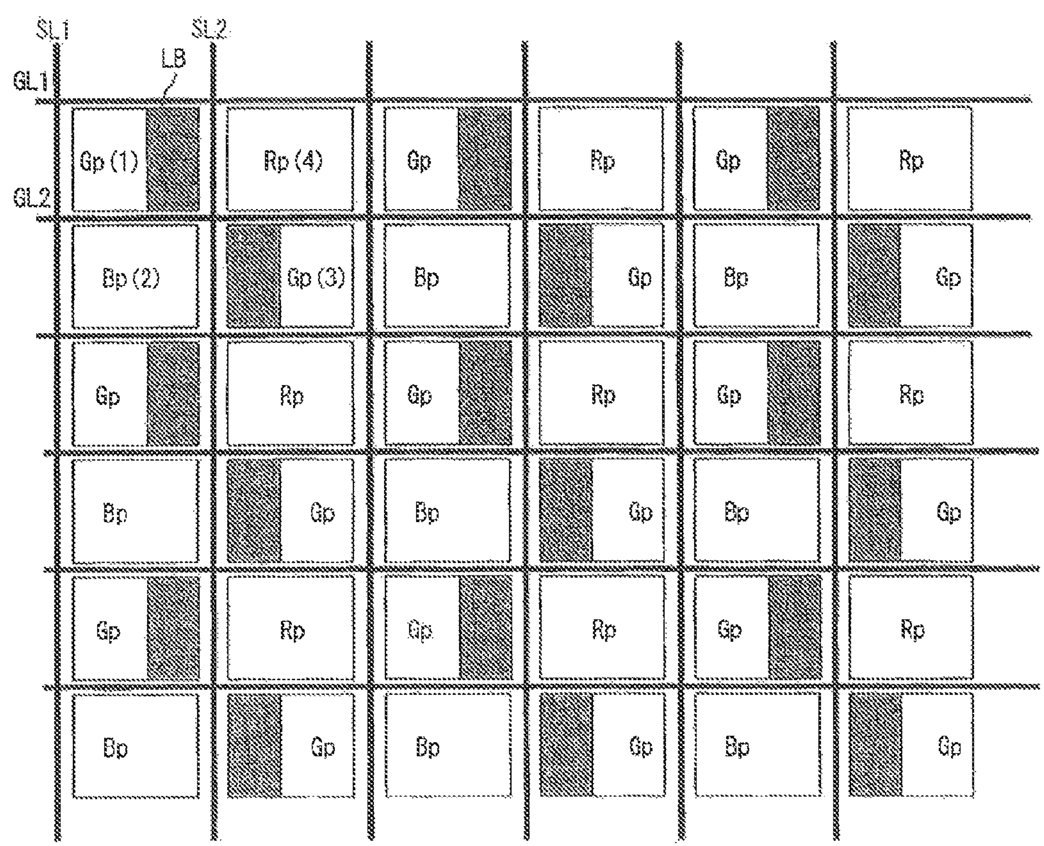
FIG. 13 is a schematic diagram illustrating another configuration of the liquid crystal display device according to Example 3.

In Example 3, as illustrated in FIG. 13, it is possible to configure such that the pixel electrode area of each of the first pixel of green Gp(1), the second pixel of blue Bp(2), the third pixel of green Gp(3) and the fourth pixel of red Rp(4) becomes equal, and that a light-shielding area LB is formed on color filter portions that correspond to the first pixel of green Gp(1) and the third pixel of green Gp(3).

In Example 3, the pixel electrode of the first pixel of green Gp(1) has a form that can be obtained by reducing one side or both sides of the pixel electrode of the second pixel of blue Bp(2), which has substantially a rectangular form. Particularly in a high-definition liquid crystal panel, if a notch (triangle or rectangle) is formed on a middle of a side of the pixel electrode, a diagonal electric field generated around a notch portion might change liquid crystal alignment, and might generate a liquid crystal panel having difficulty in achieving response control.

To cope with this, area of the pixel electrode that corresponds to green is adjusted such that the pixel electrode that corresponds to green becomes substantially similar to or analogous to (rectangle in this case) the pixel electrode that corresponds to blue or red. In other words, since influence of signal lines is linear and easy to correct, the area of the pixel electrode is adjusted by reducing the length of one side of the pixel electrode. In this case, it is desirable to reduce the length of the side parallel to the scan signal line, as illustrated in FIGS. 12 and 13, in order to minimize effects to display.

Example 4

In Example 4, the backlight BL is configured such that a color balance between green and the other colors is adjustable. Specifically, the above-described color balance is set based on a ratio of effective area of the first pixel of green Gp(1) and effective area of the second pixel of blue Bp(2), or based on a ratio of the effective area of the first pixel of green Gp(1) and effective area of the fourth pixel of red Rp(4). With this configuration, it is possible to execute setting that does not depend on a pixel structure.

Figure 14:
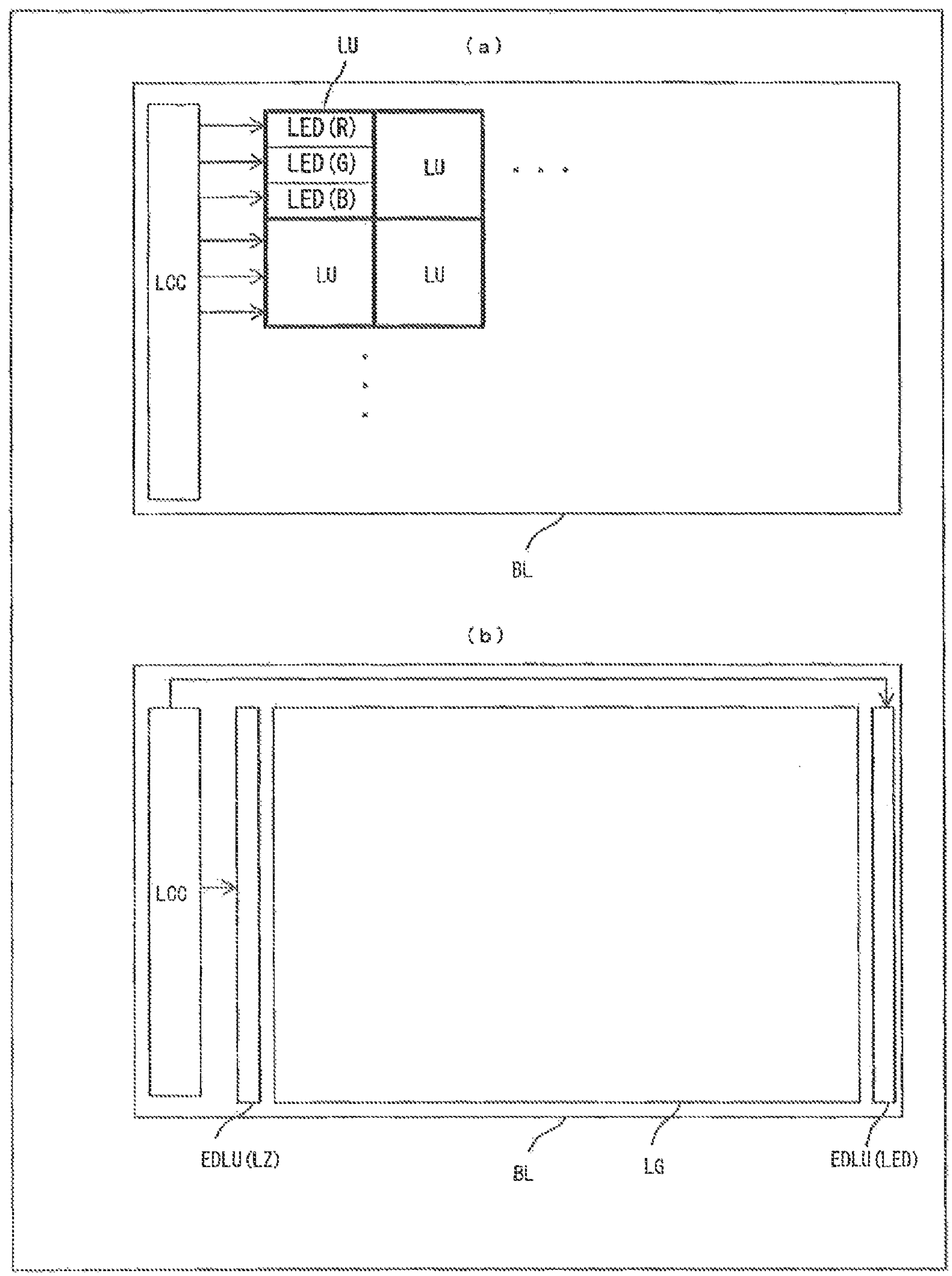
FIGS. 14(*a*) and 14(*b*) are schematic diagrams illustrating a configuration of a backlight according to Example 4.

It is desirable to configure such that the backlight BL, as illustrated in FIG. 14(*a*), is a direct-type LED illumination device equipped with a plurality of illumination units LU each of which includes a red (R) LED element, a green (G) LED element, and a blue (B) LED element, and that the LED element of each of the colors can be controlled independently from each other by an illumination control circuit LCC.

Alternatively, as illustrated in FIG. 14(*b*), the configuration may be such that the backlight BL is provided with an edge-type illumination unit EDLU(LZ) that includes a green-laser emitting element, and that green-laser light is supplied to the liquid crystal panel LCP via a light guide plate LG. According to SHV standards ITU-R BT. 2020, a reproduction range of the green color is 520 to 530 nm. For achievement of this wavelength range, a green laser is suitable. Note that for red and blue, it is also possible, as illustrated in FIG. 14(*b*), to use an edge-type illumination unit EDLU (LED) that includes an LED element. Alternatively, of course, also for red and blue, it is possible to use the edge-type illumination unit that includes a laser emitting element (EDLU (LZ)).

Example 5

Figure 15:
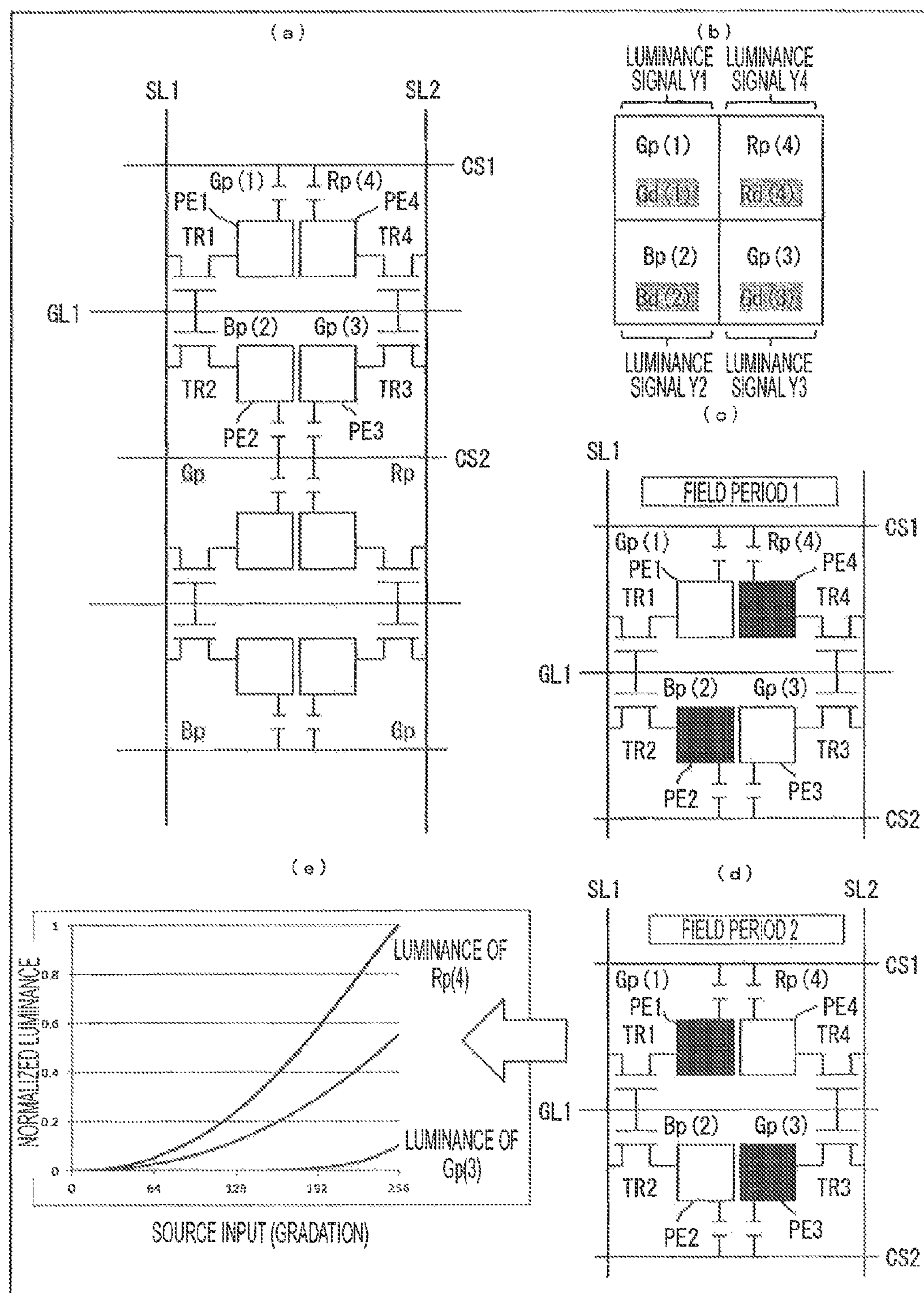
FIGS. 15(*a*) to 15(*e*) are schematic diagrams illustrating a configuration of a liquid crystal display device according to Example 5.

The liquid crystal panel LCP may be configured as illustrated in FIG. 15(*a*). Specifically, in this configuration, the first pixel of green Gp(1) is connected to the scan signal line GL1 and the data signal line SL1 via the transistor TR1, the second pixel of blue Bp(2) is connected to the scan signal line GL1 and the data signal line SL1 via the transistor TR2, the third pixel of green Gp(3) is connected to the scan signal line GL1 and the data signal line SL2 via the transistor TR3, and the fourth pixel of red Rp(4) is connected to the scan signal line GL1 and the data signal line SL2 via the transistor TR4. In addition, the auxiliary capacitance line CS1 forms an auxiliary capacitance with each of the first pixel of green Gp(1) and the fourth pixel of red Rp(4), and the auxiliary capacitance line CS2 forms an auxiliary capacitance with each of the second pixel of blue Bp(2) and the third pixel of green Gp(3). Note that in the configuration illustrated in FIG. 15(*a*), one auxiliary capacitance line (CS2, for example) is shared with two adjacent pixel rows.

In Example 5, as illustrated in FIGS. 15(*b*) and 15(*c*), in a field period 1, the luminance of the first pixel Gp(1) is set to a level higher than the luminance level of the second pixel Bp(2) so as to associate the luminance of the first pixel Gp(1) with the pixel data Gd(1) of the first pixel Gp(1) based on the luminance signal Y1, and the luminance of the third pixel Gp(3) is set to a level higher than the luminance level of the fourth pixel Rp(4) so as to associate the luminance of the third pixel Gp(3) with the pixel data Gd(3) of the third pixel Gp(3) based on the luminance signal Y3. Moreover, in a field period 2 following the field period 1, as illustrated in FIGS. 15(*b*), 15(*d*), and 15(*e*), the luminance of the second pixel Bp(2) is set to a level higher than the luminance level of the first pixel Gp(1) so as to associate the luminance of the second pixel Bp(2) with the pixel data Bd(2) of the second pixel Bp(2) based on the luminance signal Y2, and the luminance of the fourth pixel Rp(4) is set to a level higher than the level of the third pixel Gp(3) so as to associated the luminance of the fourth pixel Rp(4) with the pixel data Rd(4) of the fourth pixel Rp(4) based on the luminance signal Y4.

Figure 16:
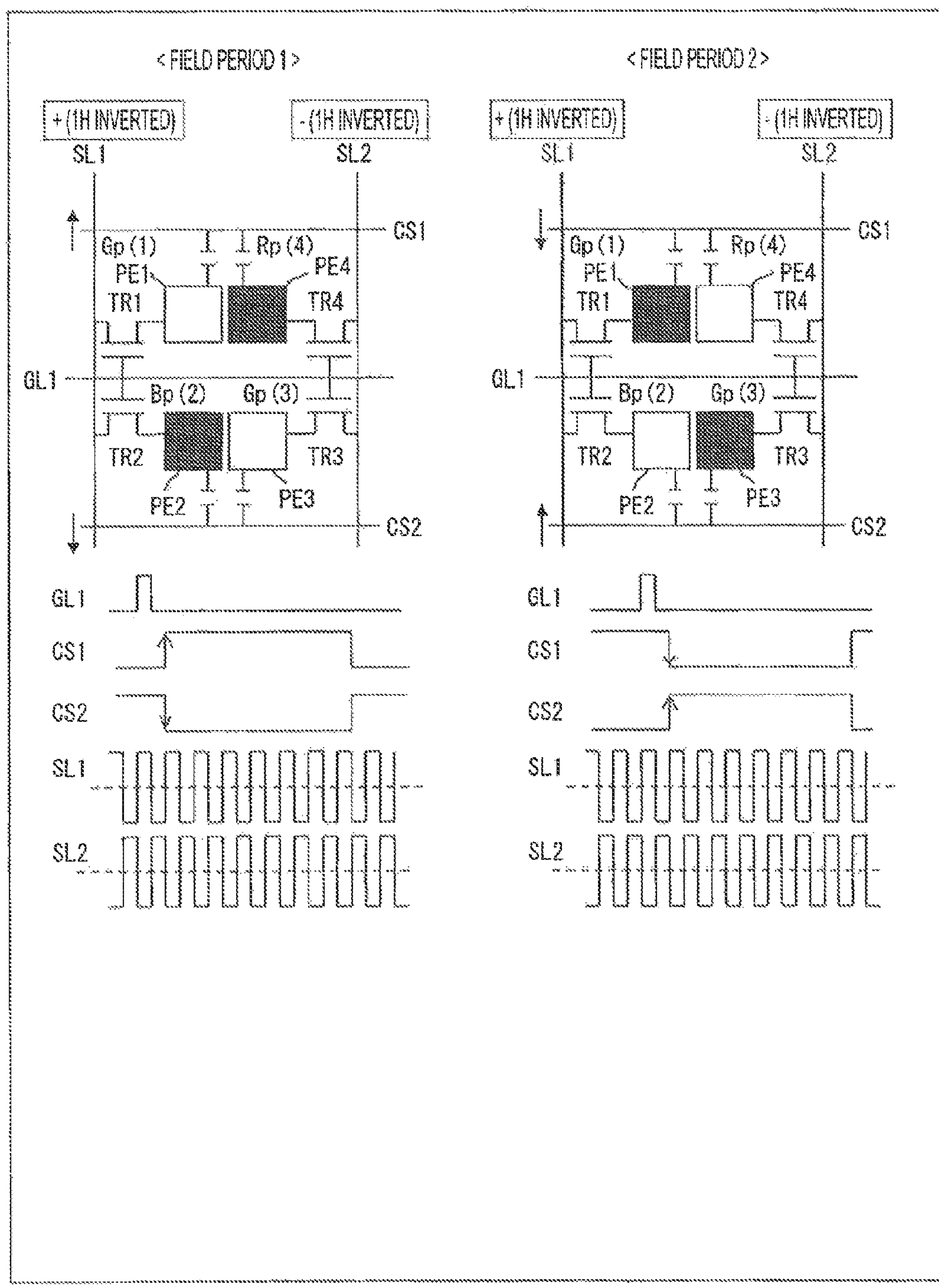
FIG. 16 is an explanatory diagram illustrating a driving method of the liquid crystal display device according to Example 5.

In Example 5, the scan signal line GL1, the data signal lines SL1 and SL2, and the auxiliary capacitance lines CS1 and CS2 are driven as illustrated in FIG. 16, for example. Specifically, the polarity of each of the data signal lines SL1 and SL2 is inverted every 1H (horizontal scan period) and the polarity at a time of starting the field period is inverted every two fields. In addition, the polarity of the data signal lines SL1 and SL2 in a same horizontal scan period are set to opposite with each other. Furthermore, a potential of each of the auxiliary capacitance lines CS1 and CS2 is oscillated (Low to High) in a constant cycle (nH). During a selection period of the scan signal line GL1 of the field period 1, the potential of the auxiliary capacitance line CS1 is set to “Low(L)”, and the potential of the auxiliary capacitance line CS2 is set to “High(H)”. After the selection period is over, the potential of the auxiliary capacitance line CS1 is set to “H” (thrust-up), and the potential of the auxiliary capacitance line CS2 is set to “L”. During the selection period of the scan signal line GL1 of the field period 2, the potential of the auxiliary capacitance line CS1 is set to “H”, and the potential of the auxiliary capacitance line CS2 is set to “L”. After the selection period is over, the potential of the auxiliary capacitance line CS1 is set to “L” (thrust-down), and the potential of the auxiliary capacitance line CS2 is set to “H” (thrust-up).

According to Example 5, compared with the configuration as illustrated in FIG. 4(*d*), it is possible to reduce the number of data signal lines (the number of input terminals on the source side) and the number of scan signal lines (the number of input terminals on the gate side).

Figure 17:
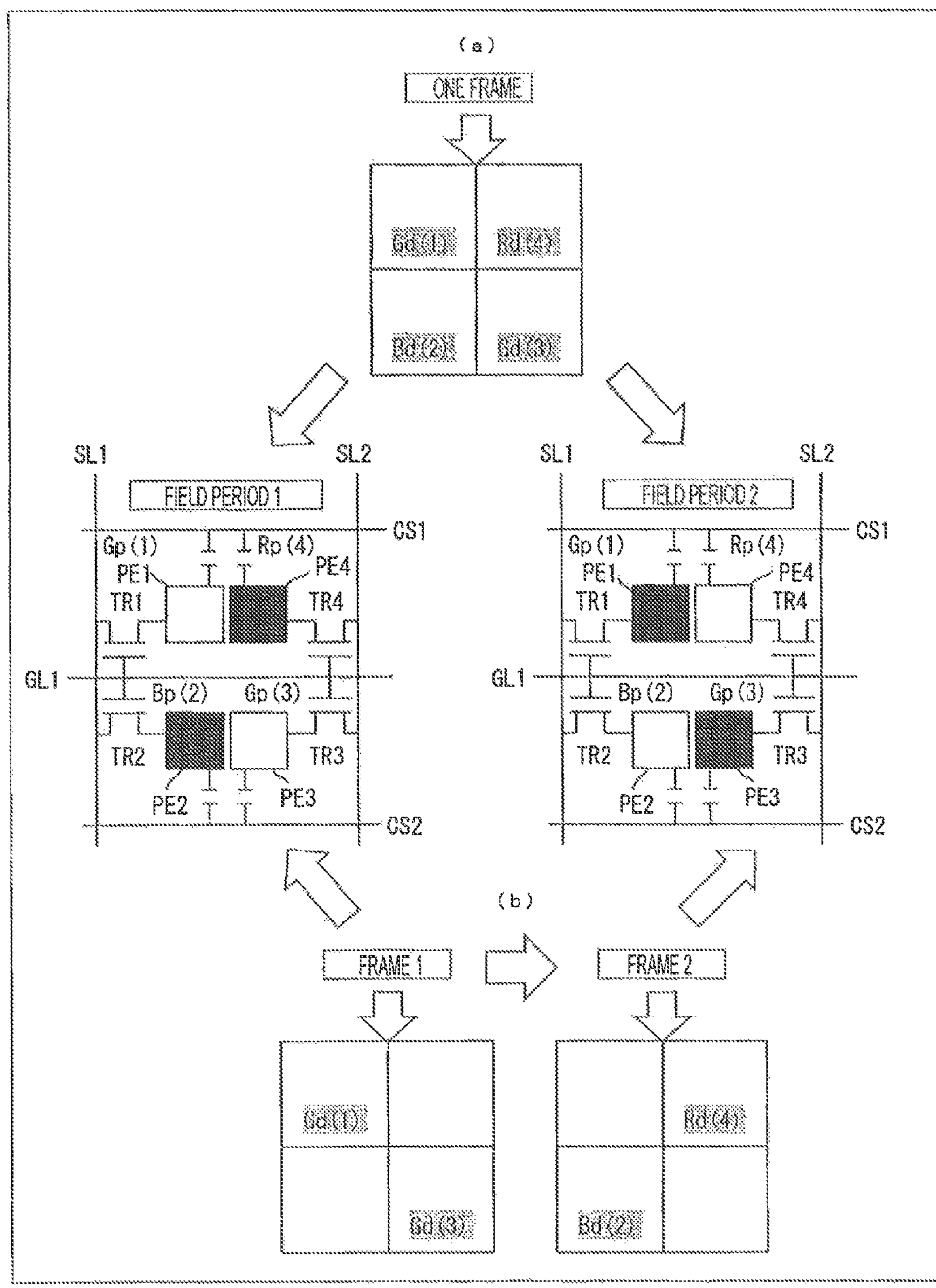
FIGS. 17(*a*) and 17(*b*) are explanatory diagrams illustrating a pixel data according to Example 5.

In Example 5, as illustrated in FIG. 17(*a*), the pixel data Gd(1), Bd(2), Gd(3), and Rd(4) of FIG. 15 may be the pixel data that can be obtained from a same frame of the image signal IGS in FIG. 1. Alternatively, as illustrated in FIG. 17(*b*), it is possible to configure such that the pixel data Gd(1) and Gd(3) of FIG. 15 are the data obtained from a certain frame of the image signal IGS (for example, Frame 1: odd-number frame), and the pixel data Bd(2) and Rd(4) are the data obtained from another frame of the image signal IGS (for example, Frame 2, even-number frame).

Summing-Up

The present display device is provided with a direct-view display panel in which a green first pixel, a blue second pixel, a green third pixel, and a red fourth pixel are arranged in a Bayer pattern. Luminance information that corresponds to a pixel position of the first pixel and serves as a basis for a display signal supplied to the first pixel can be configured to be separate from luminance information that corresponds to a pixel position of the third pixel and serves as a basis for a display signal supplied to the third pixel.

The present display device can be configured to have an imaging element on which a first light-receiving portion of green, a second light-receiving portion of blue, a third light-receiving portion of green, and a fourth light-receiving portion of red are arranged in the Bayer pattern, and on this imaging element, each of first to fourth imaging signals obtained from each of the above-described first to fourth light-receiving portions can be respectively displayed on each of the above-described first to fourth pixels.

The present display device can be configured such that the display panel is a liquid crystal panel, the first pixel is positioned adjacent to the second or fourth pixel in a column direction, and a writing polarity of a data signal is inverted every 2×i (i: positive integer) pixel in one pixel row, and inverted every 2×j (j: positive integer) pixel in one pixel column.

The present display device can be configured such that at least one of the above-described i and j is variable.

The present display device can be configured to include a setting section that sets at least one of the above-described i and j in response to an instruction from a user input section integrated with the display device, or an instruction from a user input device provided separately from the display device.

The present display device can be configured to include a human sensor and a setting section that sets at least one of the above-described i and j according to a distance between a viewer and a screen, obtained from the human sensor.

The present display device can be configured such that, when an extending direction of the data signal line of the liquid crystal panel is determined as a column direction, the above-described i is smaller than the above-described j.

The present display device can be configured such that effective area of the first pixel is smaller than effective area of the second pixel.

The present display device can be configured such that the above-described display panel is a liquid crystal panel and area of the first pixel electrode that corresponds to the first pixel is equal to area of the second pixel electrode that corresponds to the second pixel, and a light-shielding area is formed on a color filter portion facing the first pixel electrode.

The present display device can be configured such that the above-described display panel is a liquid crystal panel, area of the first pixel electrode that corresponds to the first pixel is smaller than area of the second pixel electrode that corresponds the second pixel, and area of a color filter portion facing the first pixel electrode is smaller than area of a color filter portion facing the second pixel electrode.

The present display device can be configured such that the above-described first pixel electrode has a shape that can be obtained by reducing one or both sides of the above-described second pixel electrode with a substantially rectangular shape.

The present display device can be configured such that a shape of a third pixel electrode that corresponds to the third pixel is identical to a shape of the above-described first pixel electrode, a shape of a fourth pixel electrode that corresponds to the fourth pixel is identical to a shape of the above-described second pixel electrode, and a distance between a center-of-gravity position of the above-described first pixel electrode and a center-of-gravity position of the above-described third pixel electrode is longer than a distance between a center-of-gravity position of the above-described second pixel electrode and a center-of-gravity position of the above-described fourth pixel electrode.

The present display device can be configured such that the above-described display panel is a liquid crystal panel, an illumination device is provided at a back of the liquid crystal panel, the illumination device is capable of adjusting color balance between green and the other colors, and the above-described color balance is set according to a ratio of the effective area of the first pixel and the effective area of the second pixel, or according to a ratio of the effective area of the first pixel and effective area of the fourth pixel.

The above-described illumination device can be a direct-type LED illumination device including a red LED element, a green LED element, and a blue LED element, and can be configured such that the LED element of each of the colors is controllable independently from each other.

The present display device can be configured such that the above-described illumination device includes a green laser emitting element, and green laser light is supplied to the above-described liquid crystal panel via a light guide plate.

The present display device can be configured such that the first pixel is connected to a first scan signal line and a first data signal line via a first transistor, the second pixel is connected to the first scan signal line and the first data signal line via a second transistor, the first pixel and a first auxiliary capacitance line forms an auxiliary capacitance, and the second pixel and a second auxiliary capacitance line forms the auxiliary capacitance.

The present display device can be configured such that, in a first field period, luminance of the first pixel is higher than luminance of the second pixel, and in a second field period following the first field period, the luminance of the second pixel is higher than the luminance of the first pixel.

The present display device can be configured such that, in the first field period, luminance of the third pixel is higher than luminance of the fourth pixel, and in the second field period following the first field period, the luminance of the fourth pixel is higher than the luminance of the third pixel.

The present display device can be configured such that the luminance of the first pixel of the first field period corresponds to an input image signal of the first pixel of a first frame, and the luminance of the second pixel of the second field period corresponds to an image signal of the second pixel of the first frame.

The present display device may be configured such that the luminance of the first pixel of the first field period corresponds to the input image signal of the first pixel of the first frame, and the luminance of the second pixel of the second field period corresponds to an image signal of the second pixel of a second frame input following the first frame.

The present invention is not limited to the above-described embodiments, but includes a modified embodiment appropriately obtained within the skill in the art and a combination of the modified embodiments.

INDUSTRIAL APPLICABILITY

The present invention is particularly suitable for a high-resolution display.

REFERENCE SIGNS LIST

10 display device
LCD liquid crystal display device
LCP liquid crystal panel
BL backlight
Gp green pixel
Bp blue pixel
Rp red pixel
Y1 to Y4 luminance signal

The invention claimed is:

1. A display device comprising a direct-view display panel in which a green first pixel, a blue second pixel, a green third pixel, and a red fourth pixel are arranged in a Bayer pattern, wherein the display panel is a liquid crystal panel, wherein luminance information that corresponds to a pixel position of the first pixel and serves as a basis for a display signal supplied to the first pixel is separate from luminance information that corresponds to a pixel position of the third pixel and serves as a basis for a display signal supplied to the third pixel, wherein the first pixel is positioned adjacent to the second or fourth pixel in a column direction, and a writing polarity of a data signal is inverted every 2×i pixel in one pixel row, and inverted every 2×j pixel in one pixel column;

wherein i is a positive integer and j is a positive integer;

wherein a value of at least either i or j varies between two different time fields while the display device is operating.

2. The display device according to claim 1, comprising an imaging element on which a first light-receiving portion of green, a second light-receiving portion of blue, a third light-receiving portion of green, and a fourth light-receiving portion of red are arranged in the Bayer pattern, wherein, on the imaging element, each of first to fourth imaging signals obtained from each of the first to fourth light-receiving portions is respectively displayed on each of the first to fourth pixels.

3. The display device according to claim 1, wherein effective area of the first pixel is smaller than effective area of the second pixel.

4. The display device according to claim 3, wherein area of the first pixel electrode that corresponds to the first pixel is equal to area of the second pixel electrode that corresponds to the second pixel, and a light-shielding area is formed on a color filter portion facing the first pixel electrode.

5. The display device according to claim 3, wherein area of the first pixel electrode that corresponds to the first pixel is smaller than area of the second pixel electrode that corresponds the second pixel, and area of a color filter portion facing the first pixel electrode is smaller than area of a color filter portion facing the second pixel electrode.

6. The display device according to claim 5, wherein the first pixel electrode has a shape that can be obtained by reducing one or both sides of the second pixel electrode with a substantially rectangular shape.

7. The display device according to claim 5, wherein a shape of a third pixel electrode that corresponds to the third pixel is identical to a shape of the first pixel electrode, a shape of a fourth pixel electrode that corresponds to the fourth pixel is identical to a shape of the second pixel electrode, and a distance between a center-of-gravity position of the first pixel electrode and a center-of-gravity position of the third pixel electrode is longer than a distance between a center-of-gravity position of the second pixel electrode and a center-of-gravity position of the fourth pixel electrode.

8. The display device according to claim 3, wherein an illumination device is provided at a back of the liquid crystal panel, the illumination device is capable of adjusting color balance between green and the other colors, and the color balance is set according to a ratio of the effective area of the first pixel and the effective area of the second pixel, or according to a ratio of the effective area of the first pixel and effective area of the fourth pixel.

9. The display device according to claim 8, wherein the illumination device is a direct-type LED illumination device including a red LED element, a green LED element, and a blue LED element, and the LED element of each of the colors is controllable independently from each other.

10. The display device according to claim 8, wherein the illumination device includes a green laser emitting element, and green laser light is supplied to the liquid crystal panel via a light guide plate.

11. The display device according to claim 1, wherein the value of at least either i or j varies based upon an input signal in which the display device is to operate.

12. The display device according to claim 11 wherein the input signal is inputted from a user input section integrated with the display device, or an instruction from a user input device provided separately from the display device.

13. The display device according to claim 11 wherein the input signal is a distance between a viewer and a screen.

14. The display device according to claim 13 comprising:

a human sensor;

wherein the human sensor obtains the distance.

15. The display device according to claim 13, wherein the display device increases the value of at least one of the i and j as the distance increases.

16. The display device according to claim 1, wherein i is less than j.

* * * * *